United States Patent
Kim et al.

(10) Patent No.: US 7,760,299 B2
(45) Date of Patent: Jul. 20, 2010

(54) VERTICALLY ALIGNED LIQUID CRYSTAL DISPLAY DEVICE HAVING AN OPTIMIZED VIEWING ANGLE

(75) Inventors: Tae-Hwan Kim, Seoul (KR); Sang-Il Kim, Kyungki-do (KR); Young-Chol Yang, Kyungki-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 28 days.

(21) Appl. No.: 11/351,434

(22) Filed: Feb. 9, 2006

(65) Prior Publication Data

US 2006/0164581 A1 Jul. 27, 2006

Related U.S. Application Data

(63) Continuation of application No. 10/618,142, filed on Jul. 10, 2003, now Pat. No. 7,079,208.

(30) Foreign Application Priority Data

Jul. 12, 2002 (KR) .......................... 2002-0040857

(51) Int. Cl.
*G02F 1/1335* (2006.01)
*G02F 1/1337* (2006.01)
(52) U.S. Cl. ................... 349/119; 349/118; 349/120; 349/130
(58) Field of Classification Search ................ 349/117, 349/130, 118, 119, 120, 121
See application file for complete search history.

(56) References Cited

U.S. PATENT DOCUMENTS 5,977,347 A 11/1999 Shuto et al.
6,020,945 A * 2/2000 Sawai et al. ................ 349/119
6,057,901 A * 5/2000 Xu .............................. 349/121
6,323,926 B2 * 11/2001 Watanabe et al. ........... 349/130

(Continued)

FOREIGN PATENT DOCUMENTS

CN 1188248 7/1998

(Continued)

OTHER PUBLICATIONS

Office Action mailed on Oct. 12, 2005 corresponding to the related European Patent Application No. 03 254 414.0-2205.

(Continued)

*Primary Examiner*—David Nelms
*Assistant Examiner*—David Y Chung
(74) *Attorney, Agent, or Firm*—Innovation Counsel LLP

(57) ABSTRACT

A method of improving the viewing angle of a vertically-aligned liquid crystal display device is presented. The method involves designing a uniaxial compensation film to provide a retardation value of 200 nm or less for light having a wavelength of about 550 nm. Using this uniaxial compensation film, a display device can be built by obtaining a liquid crystal panel with liquid crystal molecules contained between glass substrates, coupling the uniaxial compensation film to at least one of the glass substrates, and coupling a polarization film and electrodes to the compensation film. Preferably, the uniaxial compensation film has a thickness less than or equal to 50 microns. Where there are multiple compensation films, the total thickness and the total retardation values should be considered.

5 Claims, 17 Drawing Sheets

U.S. PATENT DOCUMENTS

| | | | |
|---|---|---|---|
| 6,362,862 B1* | 3/2002 | Itoh et al. | 349/119 |
| 6,512,561 B1* | 1/2003 | Terashita et al. | 349/118 |
| 6,565,974 B1* | 5/2003 | Uchiyama et al. | 428/412 |
| 6,812,983 B2* | 11/2004 | Arakawa | 349/117 |
| 7,079,208 B2* | 7/2006 | Kim et al. | 349/119 |
| 2001/0008920 A1 | 7/2001 | Arakawa | |
| 2001/0030726 A1 | 10/2001 | Yoshida et al. | |
| 2001/0050742 A1* | 12/2001 | Takeda et al. | 349/138 |
| 2002/0021400 A1 | 2/2002 | Lyu et al. | |
| 2002/0159011 A1* | 10/2002 | Ikeno et al. | 349/117 |
| 2006/0098145 A1* | 5/2006 | Kim et al. | 349/117 |

FOREIGN PATENT DOCUMENTS

| | | |
|---|---|---|
| CN | 1211745 | 3/1999 |
| CN | 1247326 A | 3/2000 |
| CN | 1056695 C | 9/2000 |
| EP | 1 118 885 A1 | 7/2001 |
| JP | 02242225 A | 9/1990 |
| JP | 11-024066 | 1/1999 |
| JP | 2000-081619 | 3/2000 |
| JP | 2001-042128 | 2/2001 |
| JP | 2001-194527 | 7/2001 |
| JP | 2002-055342 | 2/2002 |
| KR | 10-0265054 | 6/2000 |
| KR | 10-2001-0095282 | 11/2001 |
| KR | 10-0467513 | 1/2005 |

OTHER PUBLICATIONS

European Patent Office Action, Sep. 30, 2004, Application No. 03 254 414.0-2205 (11 pages).

European Patent Office Action, Feb. 1, 2007, Application No. 03 254 414.0-2205 (9 pages).

Liu, H.D. et al., "LP-5: Late-News Poster: A Novel Design Wide View Angle Partially Reflective Super Multi-domain Homeotropically Aligned LCD,"2002 SID International Symposium Digest Technical Papers, vol. 33, No. 1, pp. 558-561, XP 007008087, San Jose, CA, U.S.A.

Ernst Lueder; "Liquid Crystal Display—Addressing Schemes and Electrod-Optical Effects"; John Wiley & Sons, LTD, England; 2001.

* cited by examiner

68/68/51/51

80/80/79/79

55/55/68/68

42/42/50/50

35/35/42/42

31/31/36/36

80/47/80/80

80/40/80/79

60/34/70/63

50/31/57/54

44/30/50/49

39/27/45/44

75/78/62/62

80/80/79/79

69/69/80/80

55/55/68/68

47/47/58/58

80/39/80/78

59/34/75/63

49/31/58/54

43/29/51/48

38/27/46/44

VERTICALLY ALIGNED LIQUID CRYSTAL DISPLAY DEVICE HAVING AN OPTIMIZED VIEWING ANGLE

RELATED APPLICATION

This application is a Continuation of U.S. application Ser. No. 10/618,142 filed on Jul. 10, 2003, now U.S. Pat. No. 7,079,208, which claims priority, under 35 U.S.C. 119, from Korean Patent Application No. 2002-0040857 filed on Jul. 12, 2002, which is incorporated herein by reference.

BACKGROUND OF THE INVENTION

1. Field of the Invention

The present invention relates to a liquid crystal display devices.

2. Description of Related Art

A liquid crystal display ("LCD") device includes upper and lower panels provided with field-generating electrodes thereon, a liquid crystal layer interposed therebetween, a pair of a polarizer and an analyzer, compensation films, etc. The LCD generates electric field in the liquid crystal layer by applying electric voltages to the field-generating electrodes and adjusts the intensity of the electric field to control the transmittance of light passing through the liquid crystal layer, thereby displaying desired images.

One of the most widely used types of LCD has a common electrode and a plurality of pixel electrodes provided on respective panels and a plurality of thin film transistors ("TFT") for switching voltages applied to the pixel electrodes, which is provided on the panel having the pixel electrodes.

LCDs may operate in one of several modes. An LCD operating in a vertically-aligned ("VA") mode contains liquid crystal molecules aligned perpendicular to two panels. VA-mode LCDs are sometimes preferred for their high contrast ratio and wide viewing angle.

LCDs often suffer from light leakage, the severity of which increases with viewing angle. The light leakage, which causes poor visibility from the sides and a narrow viewing angle, is caused by variations in light path and in the effective angle made by the polarizer and the analyzer depending on the viewing directions.

Compensation films are sometimes used to neutralize the effect of these variations. However, use of compensation films usually significantly increases the cost of the LCD because they are expensive and there is no efficient way to select the compensation film that yields optimal results. A method of determining the optimal parameters of a compensation film without the costly trial-and-error process is needed in order to allow more LCD applications to take advantage of compensation films.

SUMMARY

The invention is a display device that includes a first substrate and a second substrate positioned parallel to each other and a liquid crystal layer interposed between the first glass substrate and the second glass substrate. The liquid crystal layer includes liquid crystal molecules whose long axes are oriented substantially orthogonal to the first and second substrates in the absence of an electrical field in the liquid crystal layer. A first compensation film is coupled to the first substrate. The first compensation film has a retardation value of less than or equal to 200 nm for light having a wavelength of about 550 nm and is negatively birefringent. A polarization film is coupled to the first compensation film, and a first electrode is formed on one of the first and second substrates.

In another aspect, the invention is a display device that includes a first substrate and a second substrate positioned parallel to each other and a liquid crystal layer interposed between the first substrate and the second substrate. A polarization film is coupled to the first substrate, and a reverse-dispersion phase difference film is positioned between the first substrate and the polarization film. An electrode is formed on one of the first and second substrates.

BRIEF DESCRIPTION OF THE DRAWINGS

The above and other advantages of the present invention will-become more apparent by describing preferred embodiments thereof in detail with reference to the accompanying drawings in which.

DETAILED DESCRIPTION OF PREFERRED EMBODIMENTS

Figure 1:
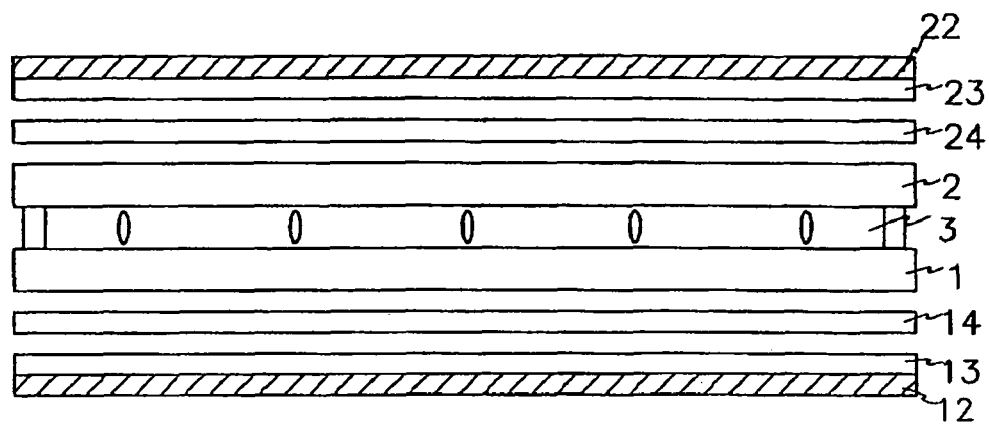
FIG. 1 is a sectional view of an LCD according to an embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, film, region, substrate or panel is referred to as being "on" another element, it can be directly on the other element or on one or more intervening elements. In contrast, when an element is referred to as being "directly on" another element, there are no intervening elements present.

Then, LCDs according to embodiments of the present invention will be described in detail with reference to the drawings.

FIG. 1 is a sectional view of a transmissive type LCD according to an embodiment of the present invention.

An LCD according to this embodiment includes a TFT array panel 1 and a color filter array panel 2 facing each other, and a liquid crystal layer 3 interposed between the two panels 1 and 2. The LCD also includes first and second polarization films 12 and 22 having nonparallel polarization axes, and first and second protective films 13 and 23 preferably made of TAC (triacetate cellulose) films and attached on the first and the second polarization films 12 and 22 for protecting the polarization films 12 and 22, respectively. The LCD further includes a first uniaxial (C-plate) compensation film 14 inserted between the TFT array panel 1 and the first protective film 13, and a second uniaxial compensation film 24 inserted between the color filter array panel 2 and the second protective film 23.

The LCD is in a vertically-aligned (VA) mode. That is, the liquid crystal layer 3 of the LCD includes liquid crystal molecules aligned to make their long axes substantially perpendicular to the two panels 1 and 2.

The first and the second protective films 13 and 23 generate slight retardation. In addition, the uniaxial compensation films 14 and 24 have negativity and generate retardation in a range between about 0 nm and about 200 nm for the light having a wavelength of 550 nm. Here, the uniaxiality means that $nx=ny \neq nz$ and the negativity means that $nx=ny>nz$, where nx, ny and nz denote the refractive indices of x, y and z directions, respectively.

The first uniaxial compensation film 14 may be omitted.

Now, a TFT array panel and a color filter array panel of an LCD according to embodiments are described in more detail.

Figure 2:
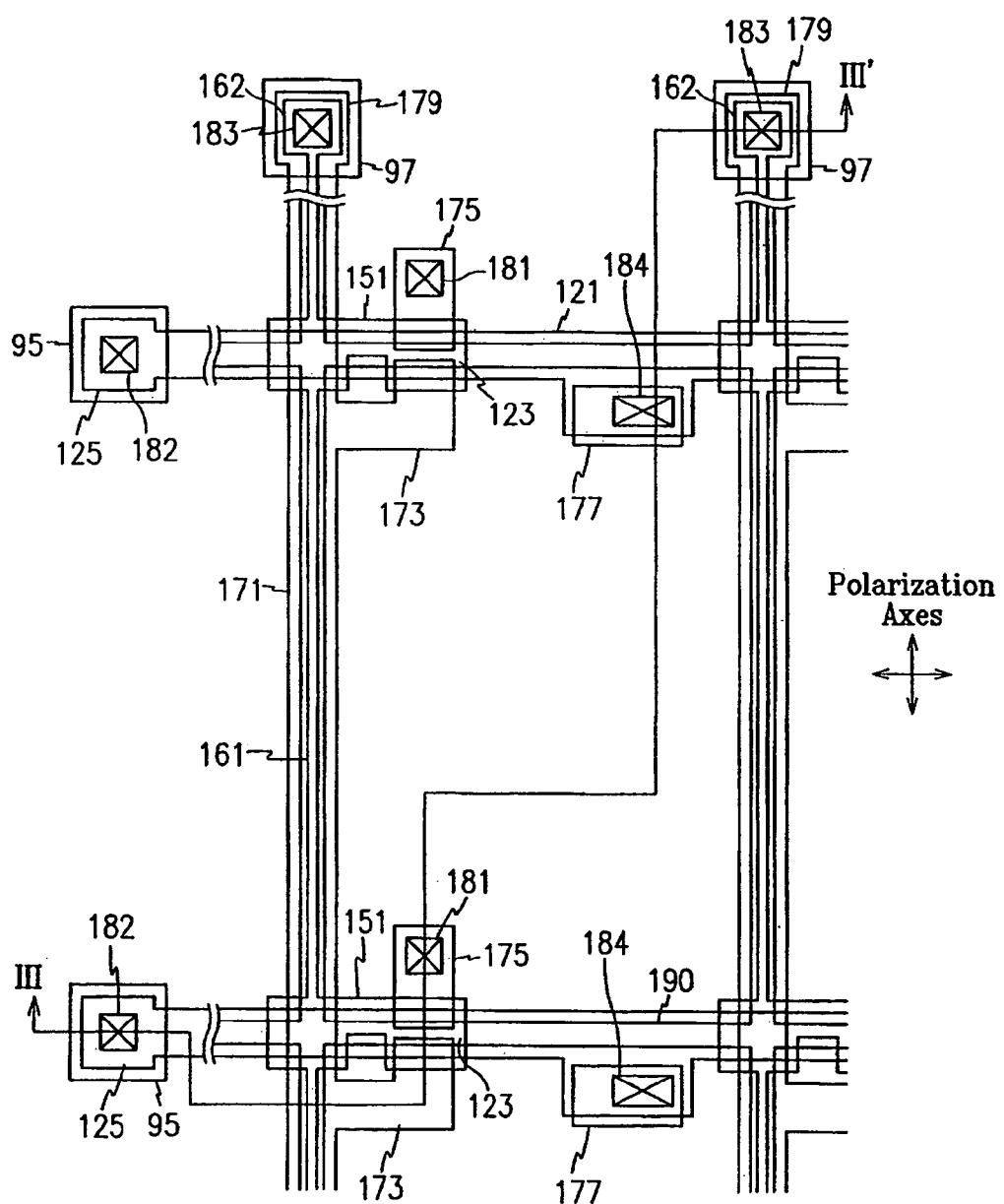
FIG. 2 is a layout view of a TFT array panel of an LCD according to an embodiment of the present invention.
Figure 3:
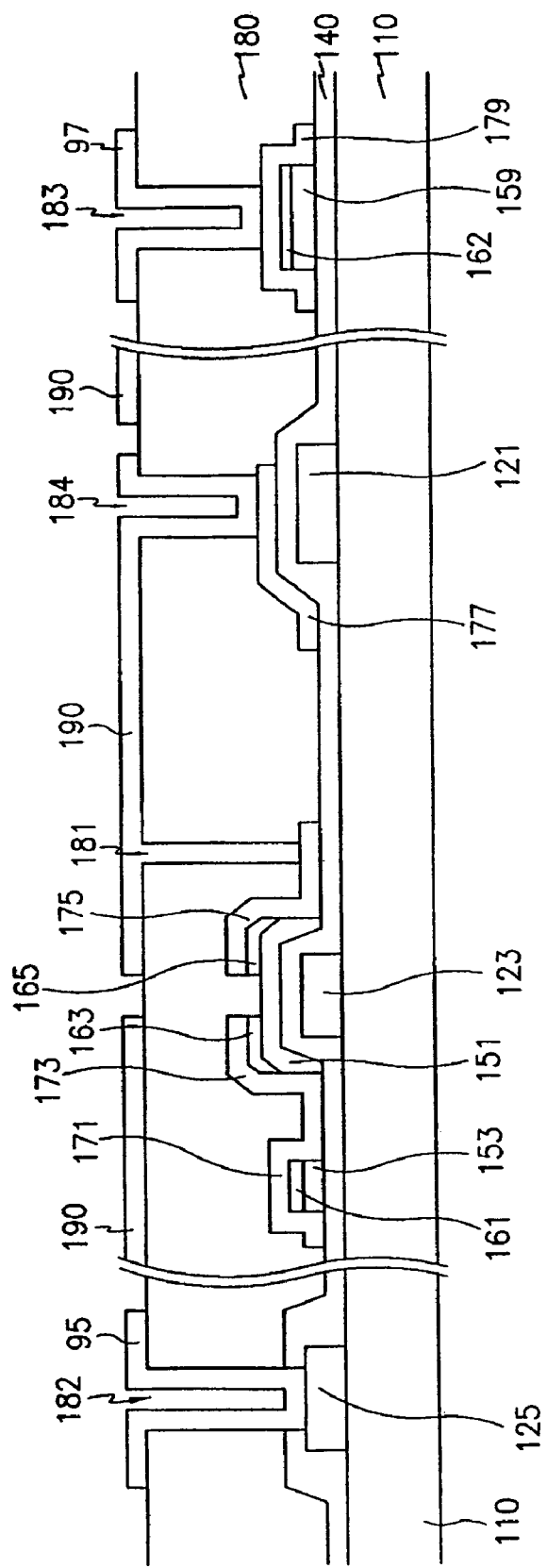
FIG. 3 is a sectional view of the TFT array panel shown in FIG. 2 taken along the line III-III'.

FIG. 2 is a layout view of a TFT array panel for an LCD according to an embodiment of the present invention, and FIG. 3 is a sectional view of the TFT array panel shown in FIG. 2 taken along the line III-III'.

As shown in FIGS. 2 and 3, a gate wire 121, 123 and 125 preferably made of a metal having low resistivity such as aluminum, silver, etc. is formed on a transparent insulating substrate 110. The gate wire 121, 123 and 125 includes a plurality of gate lines 121 extending in a transverse direction and a plurality of gate electrodes 123 connected to the gate lines 121. An end portion 125 of each gate line 121 is widened for connection with an external circuit.

A gate insulating layer 140 is formed on the entire surface of the substrate including the gate wire 121, 123 and 125.

A plurality of semiconductor stripes 151, 153 and 159 preferably made of amorphous silicon are formed on the gate insulating layer 140, and a plurality of ohmic contacts 161, 162, 163 and 165 preferably made of amorphous silicon heavily doped with n-type impurity are formed on the semiconductor stripes 151, 153 and 159.

A data wire 171, 173, 175, 177 and 179 preferably made of a metal having low resistivity such as aluminum, silver, etc. is formed on the ohmic contacts 161, 162, 163 and 165 and the gate insulating layer 140.

The data wire 171, 173, 175, 177 and 179 includes a plurality of data lines 171 intersecting the gate lines 121 to define a plurality of pixel areas, a plurality of source electrodes 173 which are branches of the data lines 171 and connected to the ohmic contacts 163, a plurality of drain electrode 175 separated from the source electrodes 173 and formed on the ohmic contacts 165 opposite to the source electrodes 173 with respect to the gate electrodes 123, and a plurality of storage electrodes 177 overlapping the gate lines 121 to form storage capacitors. An end portion 179 of each data line 171 is widened for connection with an external circuit.

A passivation layer 180 is formed on the data wire 171, 173, 175, 177 and 179. The passivation layer 180 has a plurality of first contact holes 181 exposing the drain electrodes 175, a plurality of second contact holes 182 exposing the end portions 125 of the gate lines, a plurality of third contact holes 183 exposing the end portions 179 of the data lines 171, and a plurality of fourth contact holes 184 exposing the storage electrodes 177.

A plurality of pixel electrodes 190 and a plurality of contact assistants 95 and 97 are formed on the passivation layer 180. The pixel electrodes 190 are connected to the drain electrodes 175 and the storage electrodes 177 via the first and the fourth contact holes 181 and 184, respectively, and the contact assistants 95 and 97 are connected to the exposed end portions 125 of the gate lines 121 and the exposed end portions 179 of the data lines 171 via the second and the third contact holes 182 and 183, respectively. The pixel electrodes 190 and the contact assistants 95 and 97 are preferably made of transparent material such as ITO (indium tin oxide) or IZO (indium zinc oxide).

Figure 4:
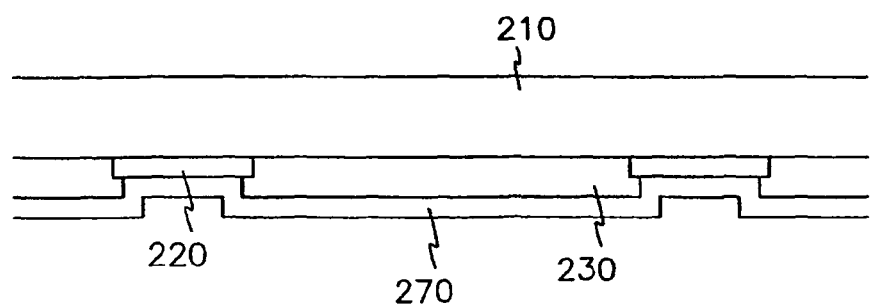
FIG. 4 is a layout view of a color filter array panel of an LCD according to an embodiment of the present invention.

FIG. 4 is a layout view of a color filter array panel of an LCD according to an embodiment of the present invention.

A black matrix 220 is formed on an insulating substrate 210, a plurality of color filters 230 are formed on the black matrix 220, and a common electrode 270 is formed on the color filters 230. The common electrode 270 is preferably made of a transparent conductive material such as ITO or IZO.

Figure 5:
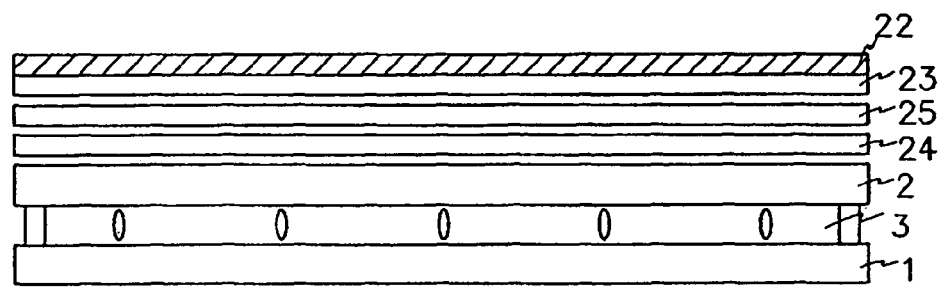
FIG. 5 is a sectional view of an LCD according to another embodiment of the present invention.

FIG. 5 is a sectional view of a reflective type LCD without separate light source according to another embodiment of the present invention.

An LCD according to this embodiment includes a TFT array panel 1 and a color filter array panel 2 facing each other, and a liquid crystal layer 3 interposed between the two panels 1 and 2. The LCD further includes a polarization film 22 and a protective film 23 attached on the polarization film 22 for protecting the polarization film 22. The LCD also includes a uniaxial compensation film 24 and a reverse dispersion phase difference film 25 inserted between the color filter array panel 2 and the protective film 23.

The LCD is in a VA mode. The protective film 23 generates slight retardation, and the uniaxial compensation film 24 has negativity and generates retardation ranging 0 nm to 200 nm for the light with 550 nm wavelength.

Figure 6:
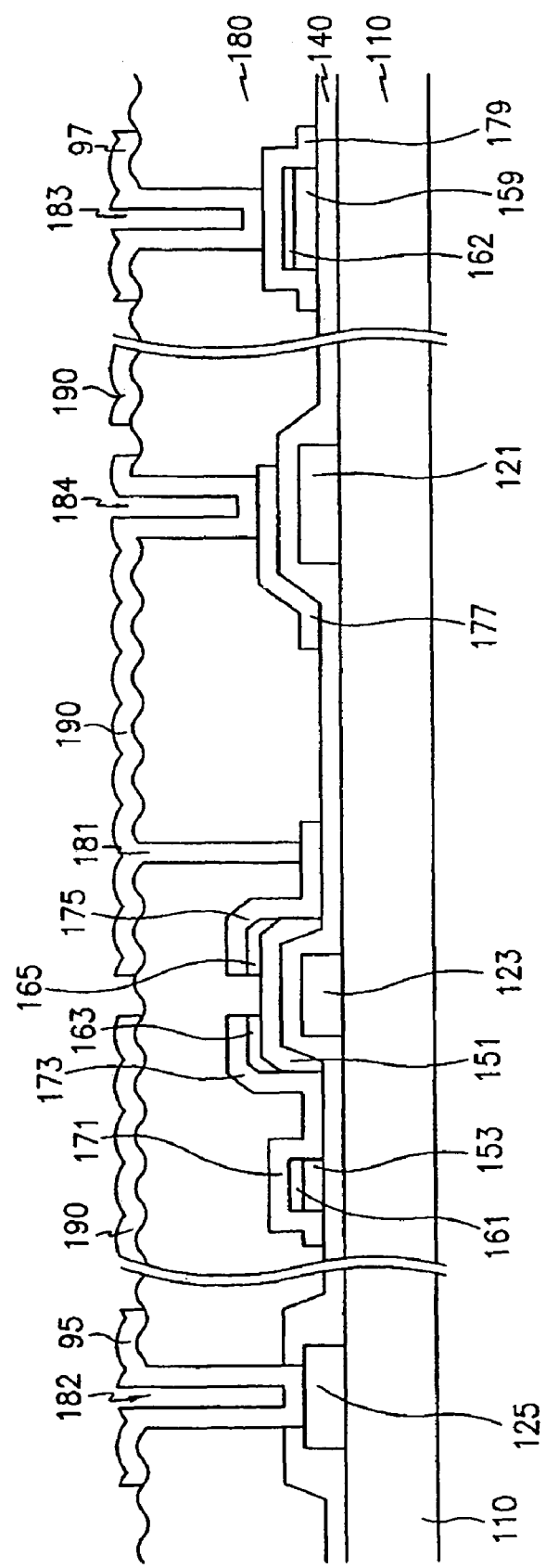
FIG. 6 is a sectional view of a TFT array panel of an LCD according to another embodiment of the present invention.

FIG. 6 is a sectional view of a TFT array panel of an LCD according to another embodiment of the present invention.

Referring to FIG. 6, a gate wire 121, 123 and 125, a gate insulating layer 140, a plurality of semiconductor stripes 151 and 153, a plurality of ohmic contacts 161, 162, 163 and 165, a data wire 171, 173, 175, 177 and 179, a passivation layer 180, a plurality of pixel electrodes 190, and a plurality of contact assistants 95 and 97 are formed on a substrate 110.

The surface of the passivation layer 180 has embossment including prominences/protrusions and depressions, and the pixel electrodes 190 are preferably made of a metal having good reflectance such as aluminum.

Figure 7:
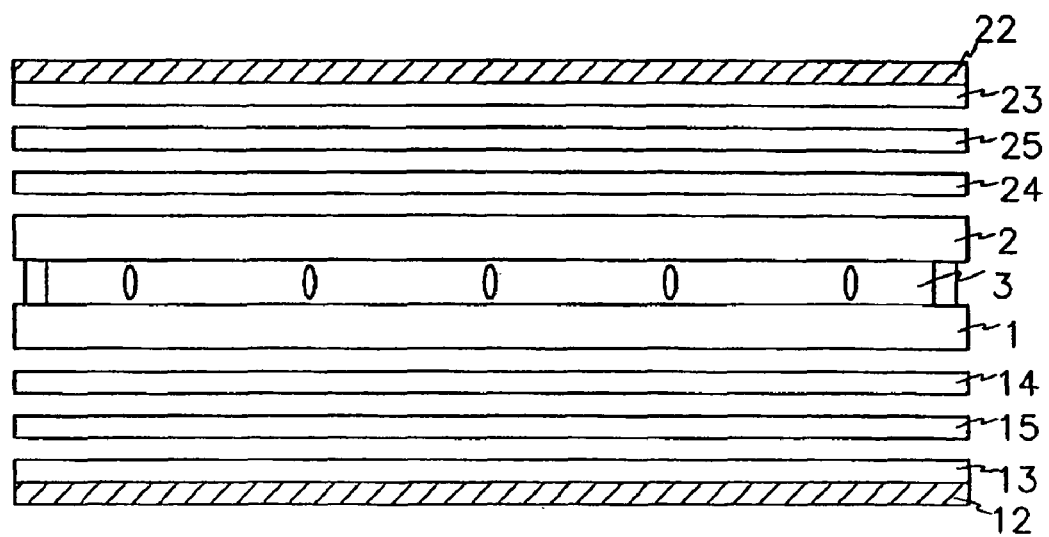
FIG. 7 is a sectional view of an LCD according to another embodiment of the present invention.

FIG. 7 is a sectional view of a transflective LCD according to another embodiment of the present invention.

An LCD according to this embodiment includes a TFT array panel 1 and a color filter array panel 2 facing each other, and a liquid crystal layer 3 interposed between the two panels 1 and 2. The LCD also includes a pair of first and second polarization films 12 and 22, and a pair of first and second protective films 13 and 23 attached on the polarization films 12 and 22, respectively. The LCD further includes a first uniaxial (C-plate) compensation film 14 and a first reverse dispersion phase difference film 15 inserted between the TFT array panel 1 and the first protective film 13, and a second uniaxial (C-plate) compensation film 24 and a second reverse dispersion phase difference film 25 inserted between the color filter array panel 2 and the second protective film 23.

The LCD is in a VA mode. The first and the second protective films 13 and 23 generate slight retardation, and the first and the second uniaxial compensation films 14 and 24 have negativity and generate retardation in a range from 0 nm to 200 nm for the light with 550 nm wavelength. The first uniaxial compensation film 14 may be omitted.

Figure 8:
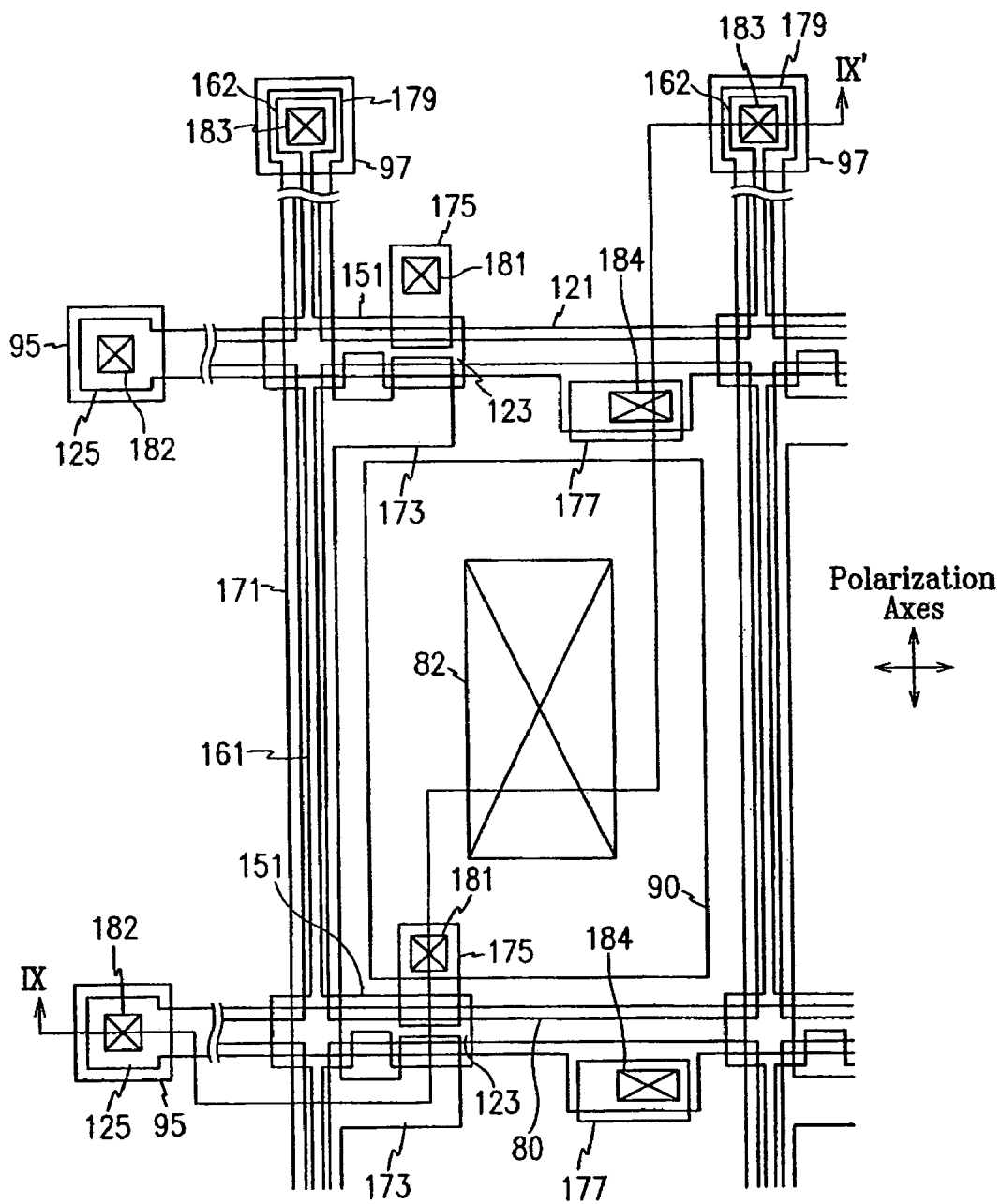
FIG. 8 is a layout view of a TFT array panel of an LCD according to another embodiment of the present invention.
Figure 9:
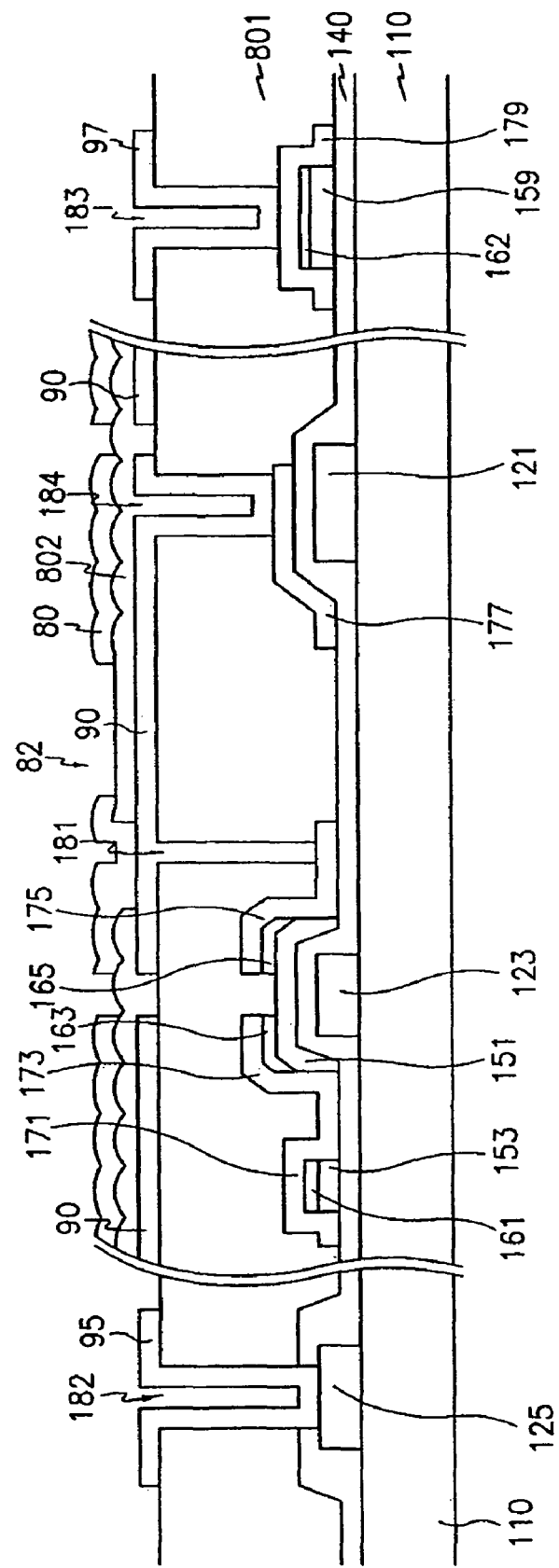
FIG. 9 is a sectional view of the TFT array panel shown FIG. 8 taken along the line IX-IX'.

FIG. 8 is a layout view of a TFT array panel of an LCD according to an embodiment of the present invention, and FIG. 9 is a sectional view of the TFT array panel shown in FIG. 8 taken along the line IX-IX'.

Referring to FIG. 8, a gate wire 121, 123 and 125, a gate insulating layer 140, a plurality of semiconductor stripes 151 and 153, a plurality of ohmic contacts 161, 162, 163 and 165, a data wire 171, 173, 175, 177 and 179, and a passivation layer 801 are formed on a substrate 110.

A plurality of transparent electrodes 90 and a plurality of contact assistants 95 and 97 preferably made of ITO or IZO are formed on the passivation layer 801. An interlayer insulating layer 802 having an embossed surface is formed on the transparent electrodes 90. A plurality of reflecting electrodes 80 are formed on the interlayer insulating layer 802, and each reflecting electrodes 80 has a window 82 for light transmission.

Various characteristics of various types of LCDs with various types of compensation films were measured.

The LCDs used for the measurement have conditions shown in TABLE 1 and TABLE 2.

TABLE 1

| Mode | VA |
| --- | --- |
| Dopant | natural pitch of 67 microns |
| Twist Angle | 90 degrees |
| Pretilt Angle | 89 degrees |
| K11 | 13.0 pN |
| K22 | 5.1 pN |
| K33 | 14.7 pN |
| ε‖ | 3.6 |
| ε⊥ | 7.4 |
| Cell Gap | 2.89 microns |

Here, K11, K22 and K33 are elastic coefficients of spreading, twisting and bending measured in pico-newton (pN) and ε‖ and ε⊥ are permittivity parallel to and perpendicular to the director, respectively.

TABLE 2

| | | | $n_\infty$ | $A(nm^{-2})$ | Thickness (microns) | Δnd for 550 nm wavelength |
| --- | --- | --- | --- | --- | --- | --- |
| Liquid Crystal | VA | ne | 1.5369 | 7651.0 | 2.89 | 240 nm |
| | | no | 1.4607 | 5569.0 | | |
| Reverse dispersion λ/4 plate | | ne | 1.5934 | −268.8 | 52.14 | 142.86 nm |
| | | no | 1.59 | 0 | | |
| TAC | | nx | ny | nz | 80 | — |
| | | 1.4800 | 1.4798 | 1.4791 | | |
| C-Plate | | nx | ny | nz | 20 | 80 nm |
| | | 1.504 | 1.504 | 1.500 | | |

Here, ne is the refractive index parallel to the director (i.e. for extraordinary ray) and no is the refractive index perpendicular to the director (i.e. for ordinary ray), while Δn=ne−no. In addition, the dispersion relation is given by:

$$n(\lambda) = n_\infty + \frac{A}{\lambda^2},$$

where $n_\infty$ is the refractive index for infinite wavelength and A is a constant.

Figure 10:
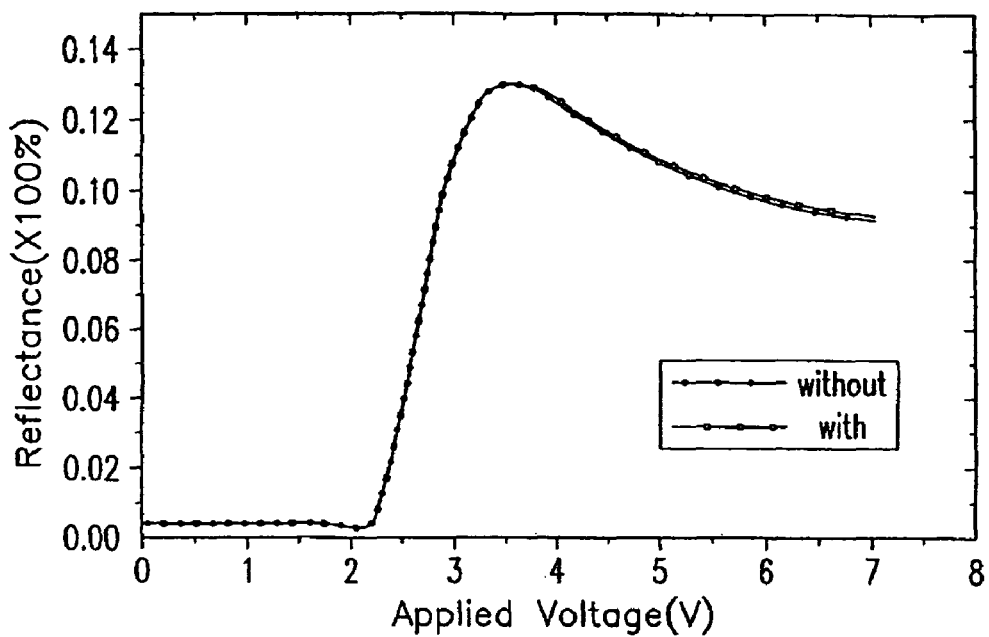
FIG. 10 is a graph showing reflectance as function of applied voltage for a transflective LCD with and without uniaxial (C-plate) compensation films.
Figure 11:
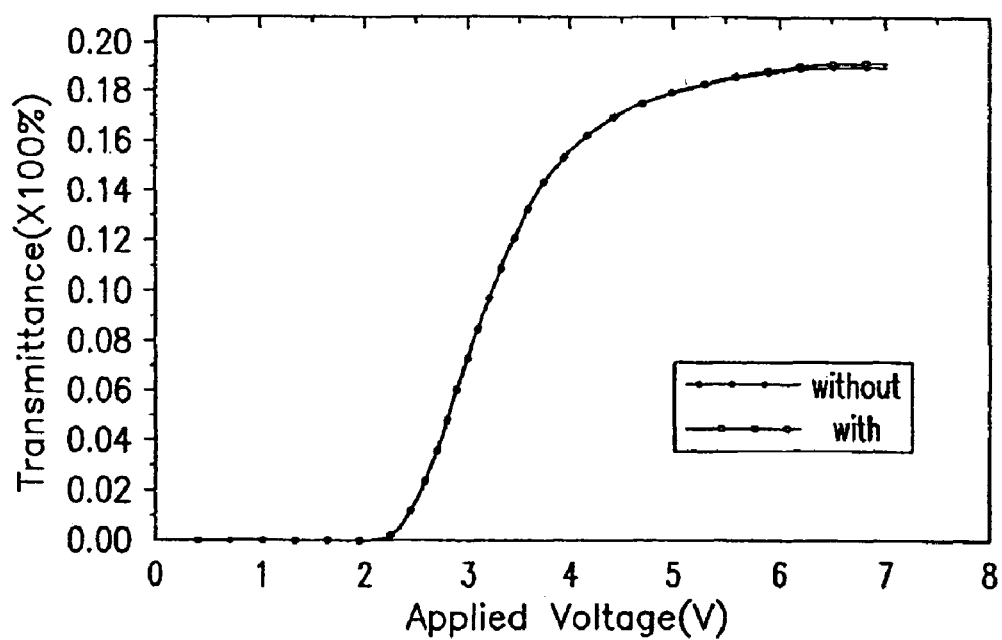
FIG. 11 is a graph showing transmittance as function of applied voltage for a transflective LCD with and without uniaxial (C-plate) compensation films.
Figure 12A:
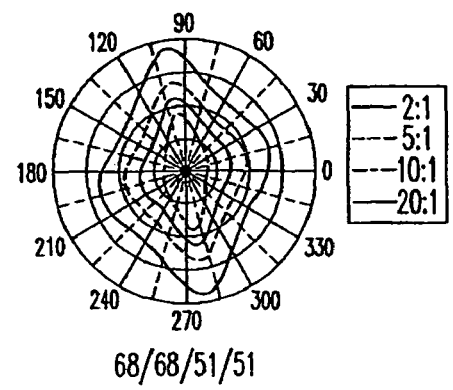
FIGS. 12A to 12F are graphs showing isocontrast curves of a reflective type LCD without and with one C-plate attached to the upper panel.
Figure 12B:
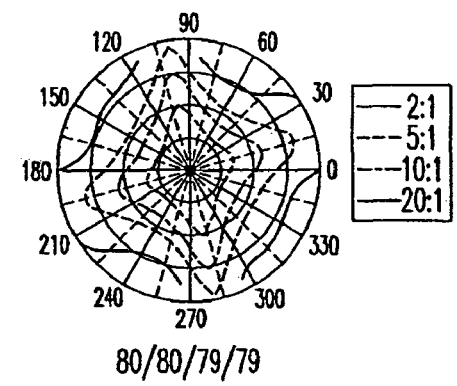
Figure 12C:
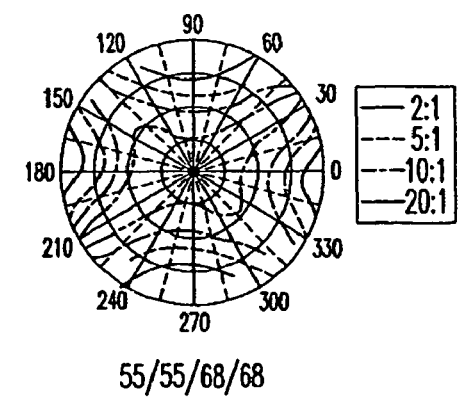
Figure 12D:
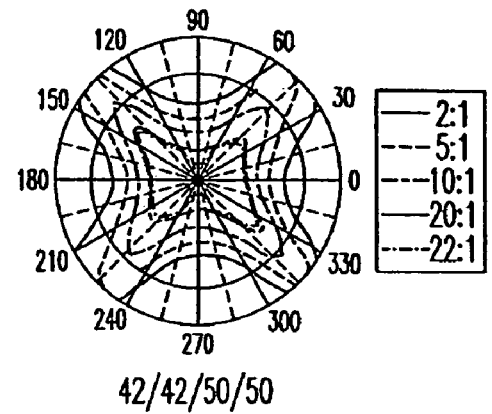
Figure 12E:
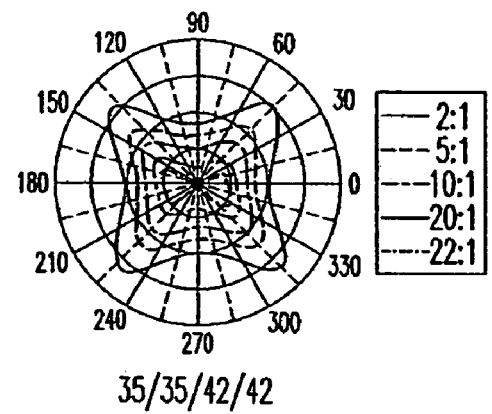
Figure 12F:
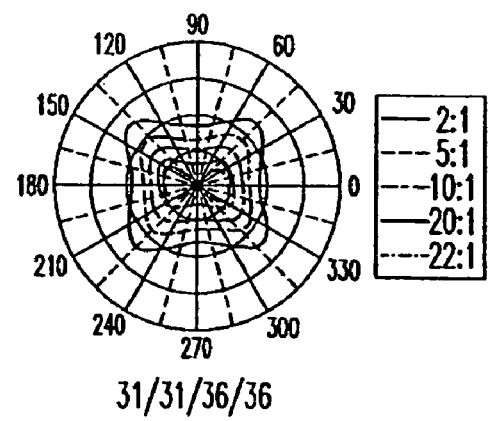
Figure 13A:
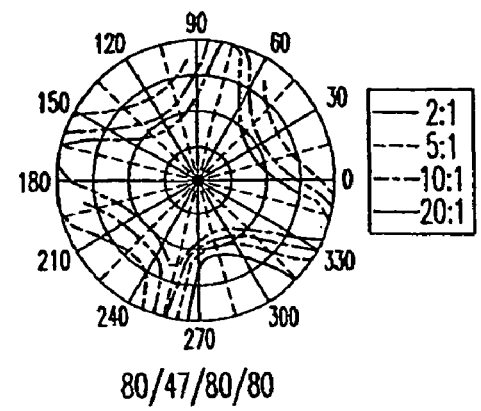
FIGS. 13A to 13F are graphs showing isocontrast curves of a transmissive type LCD without and with one C-plate attached to the upper panel.
Figure 13B:
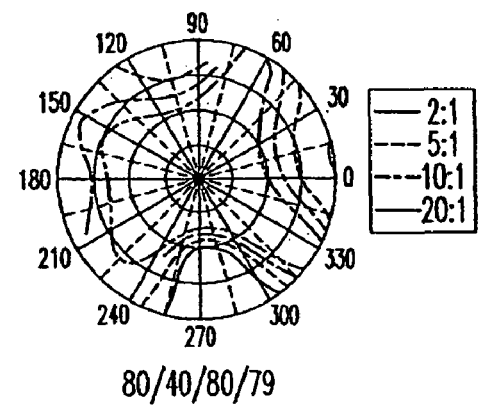
Figure 13C:
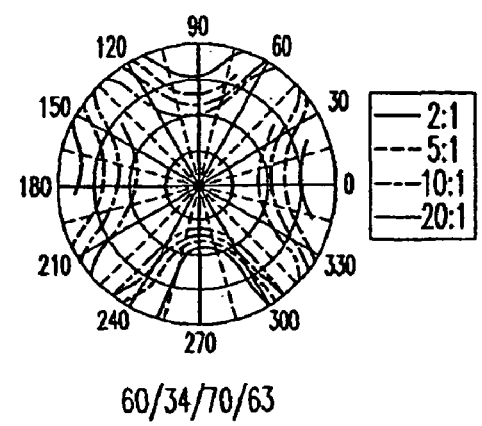
Figure 13D:
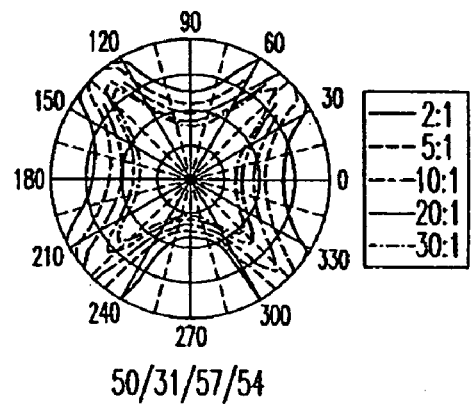
Figure 13E:
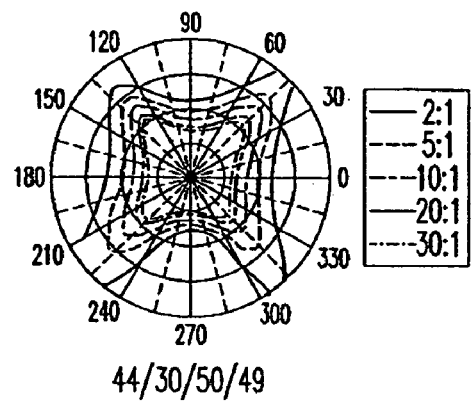
Figure 13F:
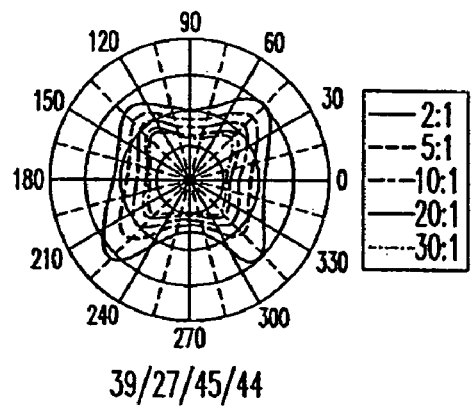
Figure 14A:
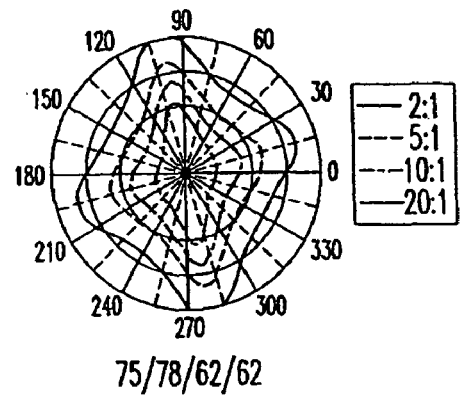
FIGS. 14A to 14E are graphs showing isocontrast curves of a reflective type LCD with C-plates attached to both upper and lower panels.
Figure 14B:
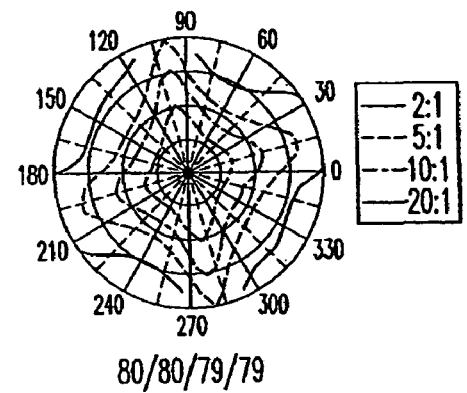
Figure 14C:
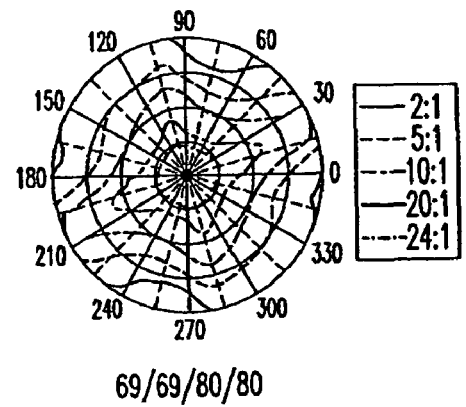
Figure 14D:
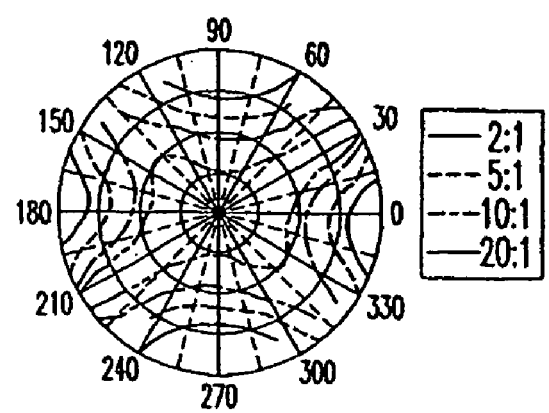
Figure 14E:
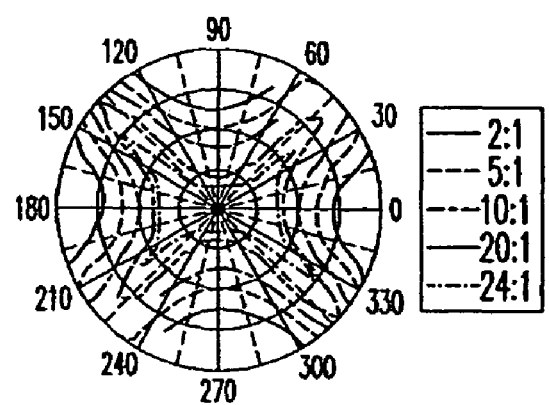
Figure 15A:
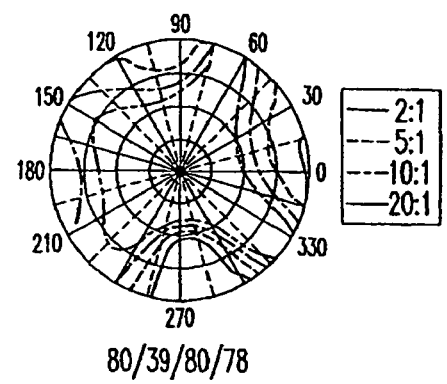
FIGS. 15A to 15E are graphs showing isocontrast curves of a transmissive type LCD with C-plates attached to both upper and lower panels.
Figure 15B:
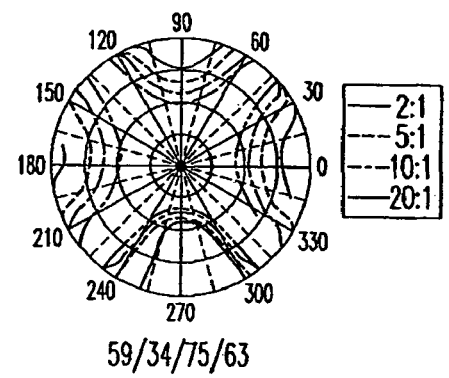
Figure 15C:
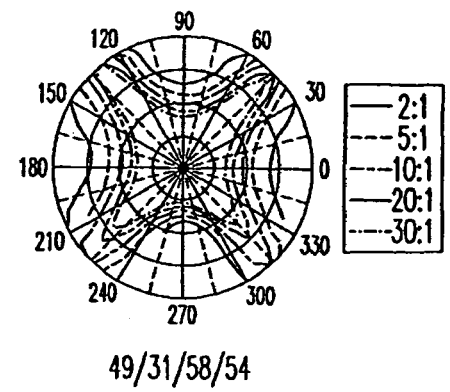
Figure 15D:
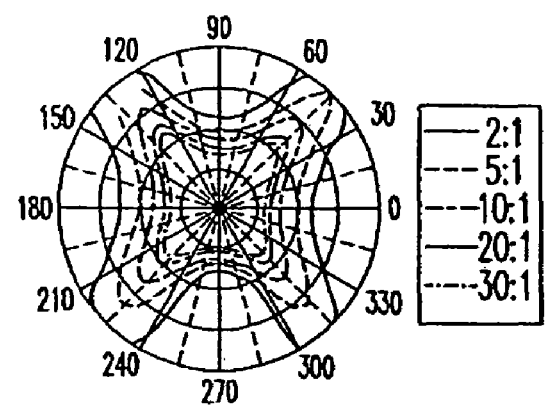
Figure 15E:
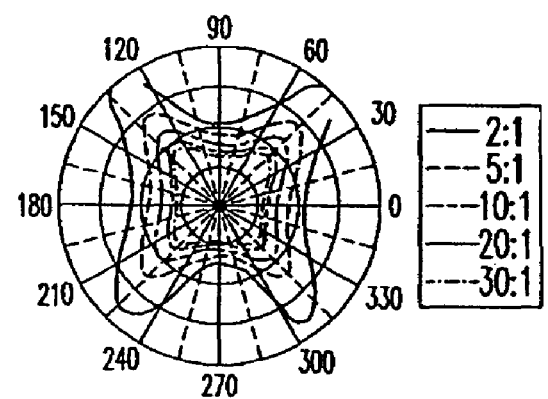

FIGS. 10 and 11 are graphs respectively showing reflectance and transmittance as function of applied voltage for a transflective LCD with and without uniaxial (C-plate) compensation films.

The curves show that the presence of the uniaxial compensation films hardly affects the reflectance and the transmittance of the LCD.

FIGS. 12A to 12F are graphs showing isocontrast curves of a reflective type LCD without and with one C-plate attached to the upper panel. FIGS. 12A to 12F show the isocontrast curves for the cases 2 to 7 in the TABLE 3, respectively.

TABLE 3

| | | Number/ | Reflective Type | | | |
| --- | --- | --- | --- | --- | --- | --- |
| Case | Mode | Thickness (um)/ Δnd of C plate | Reflectance (%) | Front view CR | Viewing Angle up/down/ (left/right) CR 2:1 | Areal Isocontrast Ratio (CR 10:1) |
| 1 | TN | None | 11.7 | 19.9 | 47/34/80/66 | 0.861 |
| 2 | VA | None | 16.9 | 26.0 | 68/68/51/51 | 0.757 |
| 3 | VA | One/ 20/80 nm | 16.9 | 25.8 | 80/80/79/79 | 1 |
| 4 | VA | One/ 40/160 nm | 16.9 | 24.0 | 55/55/68/68 | 1.324 |
| 5 | VA | One/ 60/240 nm | 16.9 | 22.1 | 42/42/50/50 | 0.987 |
| 6 | VA | One/ 80/320 nm | 16.9 | 26.6 | 35/35/42/42 | 0.723 |
| 7 | VA | One/ 100/400 nm | 16.9 | 26.6 | 31/31/36/36 | 0.603 |

FIGS. 13A to 13F are graphs showing isocontrast curves of a transmissive type LCD without and with one C-plate attached to the upper panel. FIGS. 13A to 13F show the isocontrast curves for the cases 2 to 7 in TABLE 4, respectively.

TABLE 4

| | | Number/ | Transmissive type | | | |
| --- | --- | --- | --- | --- | --- | --- |
| Case | Mode | Thickness (um)/ Δnd of C plate | Transmittance (%) | Front View CR | Viewing Angle (up/down/ left/right) CR 2:1 | Areal Isocontrast Ratio (CR 10:1) |
| 1 | TN | None | 7.4 | 378.4 | 59/59/80/80 | 1.065 |
| 2 | VA | None | 13.0 | 881.6 | 80/47/80/80 | 1.404 |
| 3 | VA | One/ 20/ 80 nm | 13.0 | 880.3 | 80/40/80/79 | 1.55 |
| 4 | VA | One/ 40/ 160 nm | 13.0 | 881.9 | 60/34/70/63 | 1.410 |
| 5 | VA | One/ 60/ 240 nm | 13.0 | 880.7 | 50/31/57/54 | 1.177 |

TABLE 4-continued

| | | Number/ | Transmissive type | | | |
|---|---|---|---|---|---|---|
| Case | Mode | Thickness (um)/ Δnd of C plate | Trans- mittance (%) | Front View CR | Viewing Angle (up/down/ left/right) CR 2:1 | Areal Isocontrast Ratio (CR 10:1) |
| 6 | VA | One/ 80/ 320 nm | 13.0 | 881.0 | 44/30/50/49 | 0.925 |
| 7 | VA | One/ 100/ 400 nm | 13.0 | 882.0 | 39/27/45/44 | 0.797 |

FIGS. 14A to 14E are graphs showing isocontrast curves of a reflective type LCD with two C-plates respectively attached to upper and lower panels. FIGS. 14A to 14E show the isocontrast curves for Cases 8 to 12, respectively.

TABLE 5

| | | Reflective type | | | | |
|---|---|---|---|---|---|---|
| Case | Mode | Thickness (um)/ Δnd of C plate | Reflec- tivity (%) | Front view CR | Viewing Angle (up/down/ left/right) CR 2:1 | Areal Isocontrast Ratio (CR 10:1) |
| 8 | VA | 10/ 40 nm × 2 | 16.9 | 23.2 | 75/78/62/62 | 0.861 |
| 9 | VA | 20/ 80 nm × 2 | 16.9 | 25.8 | 80/80/79/79 | 1 |
| 10 | VA | 30/ 120 nm × 2 | 16.9 | 24.3 | 69/69/80/80 | 1.209 |
| 11 | VA | 40/ 160 nm × 2 | 16.9 | 24.0 | 55/55/68/68 | 1.324 |
| 12 | VA | 50/ 200 nm × 2 | 16.9 | 24.3 | 47/47/58/58 | 1.242 |

FIGS. 15A to 15E are graphs showing isocontrast curves of a transmissive type LCD with two C-plates respective attached to upper and lower panels. FIGS. 15A to 15E show the isocontrast curves for Cases 8 to 12 in TABLE 6, respectively.

TABLE 6

| | | Transmissive Type | | | | |
|---|---|---|---|---|---|---|
| Case | Mode | Thickness (um)/ Δnd of C plate | Trans- mit- tance (%) | Front View CR | Viewing Angle (up/down/ left/right) CR 2:1 | Areal Isocontrast Ratio (CR 10:1) |
| 8 | VA | 10/ 40 nm × 2 | 13.0 | 881.0 | 80/39/80/78 | 1.565 |
| 9 | VA | 20/ 80 nm × 2 | 13.0 | 881.8 | 59/34/75/63 | 1.430 |
| 10 | VA | 30/ 120 nm × 2 | 13.0 | 881.2 | 49/31/58/54 | 1.215 |
| 11 | VA | 40/ 160 nm × 2 | 13.0 | 881.6 | 43/29/51/48 | 0.958 |
| 12 | VA | 50/ 200 nm × 2 | 13.0 | 882.1 | 38/27/46/44 | 0.817 |

In TABLES 3 to 6, the areal isocontrast ratio is an isocontrast area for the contrast ratio of 10:1 divided by that in Case 3 of the reflective type LCD. White and black voltages in VA mode are 3.5V and 1.8V for the reflective type and 4.5V and 1.8V for transmissive type, respectively. The abbreviation "CR" stands for contrast ratio.

The ratios such as 2:1, 5:1, 10:1, 20:1 and 22:1 in the legends of FIGS. 12A to 15E indicate contrast ratios and the values (for example, 68/68/51/51 in FIG. 12A) at the bottom of FIGS. 12A to 15E indicate upper/lower/left/right side viewing angles giving the contrast ratio of 2:1.

The measurement values of TABLES 3 to 6 shown in FIGS. 12A to 12F, 13A to 13F, and 14A to 15E can be summarized as follows.

Without uniaxial compensation film (C-plate), the transmittance, the reflectance, the contrast ration at the front view, and the viewing angle of the VA mode are superior to those of the TN mode.

Compared with Case 2, which does not include a uniaxial compensation film, Cases 3 and 4 of the VA mode show both improved viewing angle and improved isocontrast curve, and Cases 3 and 4 of the transmissive mode show improved isocontrast curves. In contrast, Cases 5, 6 and 7, each of which includes a compensation film causing a retardation greater than 160 nm, show deteriorated viewing angle and deteriorated isocontrast curves. Data indicates that a uniaxial compensation film providing a retardation value larger than 160 nm has a detrimental effect on the LCD device.

With uniaxial compensation films attached to both upper and lower panels, the isocontrast curves for the transmissive-type LCDs are improved until the sum of the retardation values of the two compensation films equals to 160 nm. When the combined retardation value exceeds 160 nm, both the isocontrast curves and the viewing angles become worse. For the reflective-type LCDs, only one of the two compensation films contributes to the total retardation since light is not transmitted through both of films. Therefore, the actual retardation values of the compensation films for the cases 8 to 11 are equal to or smaller than 160 nm. This explains why case 12 for the reflective-type LCD shows improved isocontrast curves in spite of having a retardation value of 200 nm. For the transmissive-type LCD, although there is no experimental example for the case of 200 nm retardation, the results shown in TABLES 3 to 6 suggest that the isocontrast curves will be improved where retardation values are equal to or less than 200 nm.

The above-described experimental results show a correlation between the total thickness of the uniaxial compensation film(s) and the viewing angle and/or the contrast ratio. It appears that the total thickness of the uniaxial compensation film(s) affects the viewing angle and/or the contrast ratio more than the number or the physical arrangement of the uniaxial compensation film(s).

Of the cases above, Case 3 has optimal characteristics both for the transmissive type and the reflective type LCDs. Although some cases show better contrast ratio at the front view than Case 3, the difference is small. Overall, Case 3 resulted in a better viewing angle than the other cases. Therefore, it can be said that Case 3 is optimized.

In conclusion, the total retardation of the uniaxial compensation film(s) equal to or under 200 nm improves the isocontrast curve and/or the viewing angle. This improvement is irrelevant to the number of uniaxial compensation films used and the type (reflective or the transmissive) of LCD.

According to the present invention, uniaxial compensation film(s) generating a predetermined retardation is used to improve the viewing angle of the LCD.

What is claimed is:
1. A display device of a reflective type, the display device comprising:
  a first substrate comprising a color filter array panel;
  a second substrate comprising a TFT array panel, the second substrate positioned parallel to the first substrate;

a liquid crystal layer interposed between the first and second substrates;

a single compensation film coupled only to the first substrate;

a polarization film coupled to the compensation film; and a reverse dispersion phase difference film located between the compensation film and the polarization film, wherein the compensation film has refractive indices nx, ny, and nz that satisfy the relation nx=ny>nz.

2. The display device of claim 1, wherein the liquid crystal layer comprises liquid crystal molecules whose long axes are oriented substantially orthogonal to the first and second substrates in the absence of an electric field in the liquid crystal layer.

3. The display device of claim 1, wherein the compensation film has a retardation value less than or equal to 200 nm for light having a wavelength of about 550 nm.

4. The display device of claim 1, wherein the compensation film is negatively birefringent.

5. The display device of claim 1, wherein the reverse dispersion phase difference film is a $\lambda/4$.

* * * * *